United States Patent [19]

Brown, deceased et al.

[11] 4,040,441
[45] Aug. 9, 1977

[54] CHECK VALVE ASSEMBLY

[76] Inventors: Cicero C. Brown, deceased, late of Houston, Tex.; Joe Russell Brown, executor; Ramey Lee Brown, executor, both of P.O. Box 19236, Houston, Tex. 77024

[21] Appl. No.: 495,901

[22] Filed: Aug. 8, 1974

Related U.S. Application Data

[62] Division of Ser. No. 322,226, Jan. 9, 1973, Pat. No. 3,850,191.

[51] Int. Cl.² .................................................. F16K 15/04
[52] U.S. Cl. ............................... 137/519.5; 137/460; 166/325
[58] Field of Search .............................. 166/224, 226; 137/519.5, 533.11, 533.13, 533.15, 495, 496, 498, 460, DIG. 2

[56] References Cited

U.S. PATENT DOCUMENTS

| | | | |
|---|---|---|---|
| 924,207 | 6/1909 | Wilson | 137/533.11 |
| 965,102 | 7/1910 | Griogi | 137/533.11 X |
| 2,741,260 | 4/1956 | Verhoeff et al. | 137/460 |
| 2,743,905 | 5/1956 | Eckel | 137/533 X |
| 2,981,285 | 4/1961 | Nilo | 137/533.13 X |
| 3,269,463 | 8/1966 | Page, Jr. | 137/519.5 X |
| 3,332,497 | 7/1967 | Page, Jr. | 137/496 X |
| 3,334,697 | 8/1967 | Edwards et al. | 166/224 X |
| 3,584,645 | 6/1971 | Radig | 137/519.5 X |

Primary Examiner—William R. Cline
Attorney, Agent, or Firm—Carlos A. Torres

[57] ABSTRACT

A check valve assembly for use in a drill string to prevent reverse flow of drilling fluid through the string while permitting such fluid to be pumped downwardly through the well under normal conditions. The assembly includes: a valve body; a ball valve member, normally located out of the flow path in a side recess; a valve seat located above the valve member and means for controlling the rate of reverse flow of fluid required to move the valve member out of the side recess and against the valve seat.

7 Claims, 12 Drawing Figures

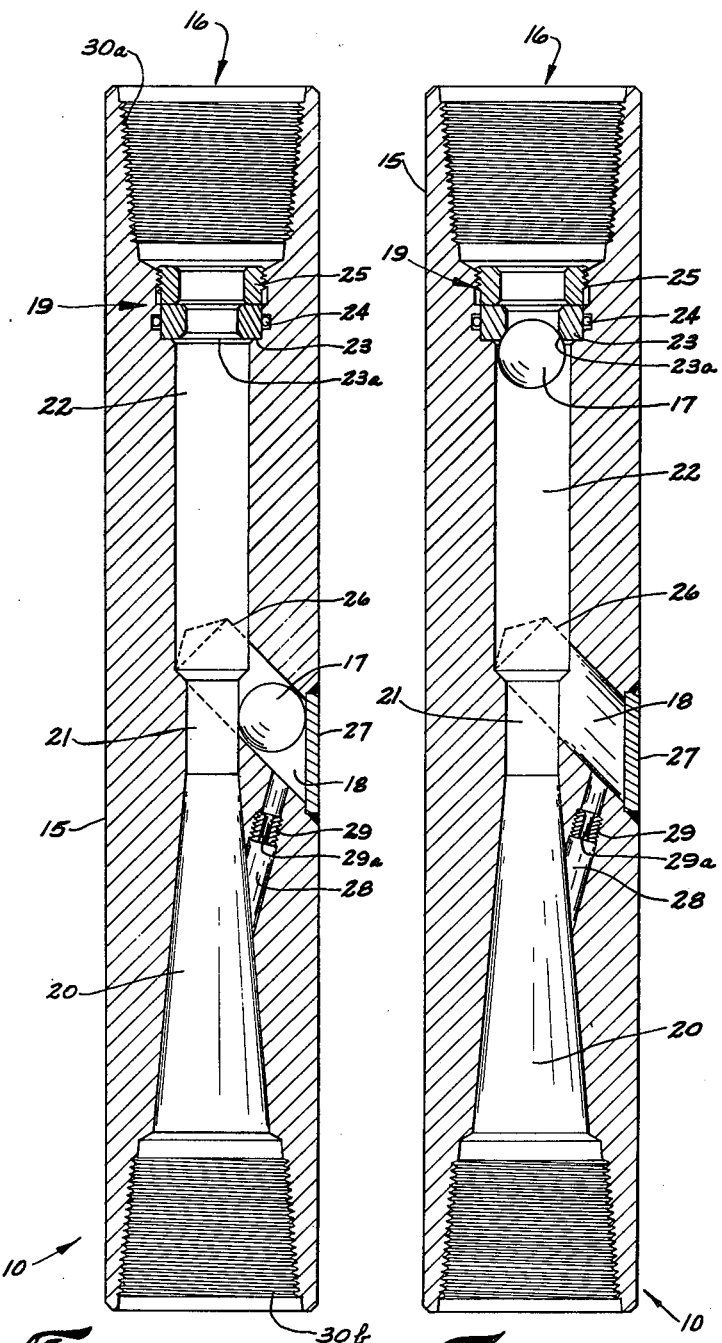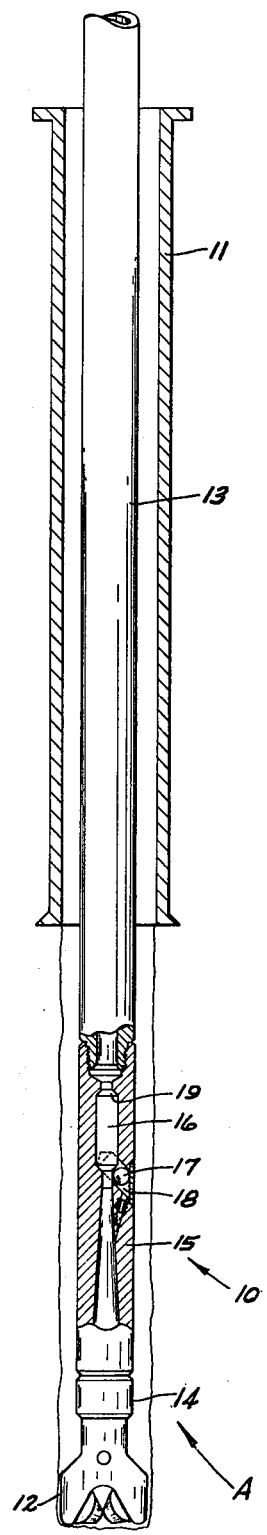
Fig. 2  Fig. 3  Fig. 1

CHECK VALVE ASSEMBLY

CROSS-REFERENCE TO RELATED APPLICATION

The present invention is a division of application Ser. No. 322,226, filed Jan. 9, 1973, now issued as U.S. Pat. No. 3,850,191.

BACKGROUND OF THE INVENTION

1. Field of the Invention

The present invention relates to means for preventing reverse fluid flow through pipe. More specifically, the present invention relates to a check valve assembly suitable for employment in a drill string in which drilling fluid or "mud" is being pumped downwardly through the string. The assembly is designed to prevent upward flow of the drilling fluid when the drill bit enters a high pressure area.

2. Description of the Prior Art

When drilling a well, there may arise a need for a device to prevent the uncontrolled upward flow of the drilling fluid or mud in the drill string, e.g., if the drill bit enters a high pressure area. Under normal operating conditions, the device should allow unrestricted downward flow of the mud.

The prior art has suggested a number of valve assemblies designed to allow fluids or fluent materials to be pumped down through a drill string and to prevent reverse or upward flow therethrough. See, for example, U.S. Pat. Nos. 1,577,740 and 1,790,480. If the valve elements are directly in the flow stream, the materials pumped down through the drill string may erosively wear the valve components, particularly when such materials carry abrasive particles.

Previous check valve devices have employed a ball valve member and a seat member, along with a retainer or cage assembly. In these devices, the valve assembly is located directly in the flowstream and, therefore, subjected to the erosive action of abrasive material in the fluid. Such valves also restrict the downward flow of fluid and, with the valve assembly located directly in the flowstream, it is impossible for equipment to be lowered through the drill string past the assembly.

During drilling operations, the drill string may frequently be removed from the bore for maintenance of the drill bit. The valve assembly should allow fluid to empty from the drill string when it is raised from the bore. It is preferable that the valve assembly also allow fluid to flow at a predetermined rate upward past the assembly when the drill string is being lowered into the well bore. By allowing the drill string to fill from the bottom, fluid does not have to be pumped in at the top to lower the drill string and to prevent the drill string from collapsing because of pressure differentials. Valve assemblies previously used, either allow no reverse fluid flow, or a predetermined amount of flow at all times. The valve that allows fluid to flow all the time is undesirable. Such a valve works fine when lowering the drill string into the well bore; but, when the drill bit enters a high pressure area, the flow can never be completely stopped.

Other devices have been designed to control only the upward flow of fluid in well tubing and are not designed for use in a drill string, where fluid is allowed to flow in both directions. These devices are used in production strings to shut off the flow of oil when damage occurs to equipment at the wellhead. See, for example, U.S. Pat. Nos. 3,269,463; 3,332,497; 3,332,498; 3,411,585; 3,568,768; 3,584,645; and 3,662,824. Many of these devices have a ball valve located in a side pocket out of the flowstream and a movable inner sleeve for displacing the ball from the side pocket when the differential pressure is increased sufficiently.

SUMMARY OF THE INVENTION

The present invention provides a new and improved drill string check valve assembly with an unrestricted flow path which allows unrestricted downward flow and passage of flowline equipment; but, which is provided with a means for regulating the rate of reverse flow so that the drill string can be lowered into the well bore without having to pump fluid into the top of the drill string. In a preferred form of the invention, a tubular housing is provided, having a recess in its wall, for normally retaining a ball valve closure member out of the flowstream. Thus, the ball itself doesn't restrict the downward flow of fluid and is protected from erosion by abrasive material in the fluid. The ball recess may communicate with the lower central bore of the tubular housing, via a pressure equalizing passage, which has an orifice bushing that can be changed to regulate the reverse flow rate.

Another advantage of the present invention is its simplicity of design and construction. It doesn't require special machining or special castings as in previous designs. Furthermore, the design is such that the assembly doesn't have to be completely removed from the drill string when maintenance is required.

The foregoing and other features and advantages of the present invention will be more fully understood from the following specifications, claims and the related drawings.

BRIEF DESCRIPTION OF THE DRAWINGS

FIG. 1 is a vertical elevation, partially in section, schematically illustrating the check valve assembly of the present invention employed in a drill string;

FIG. 2 is an enlarged vertical cross section illustrating a preferred embodiment of the check valve assembly of the present invention showing the assembly in an open position;

FIG. 3 is a view similar to FIG. 2, illustrating the check valve assembly in a closed position;

DESCRIPTION OF THE PREFERRED EMBODIMENT

Figure 4:
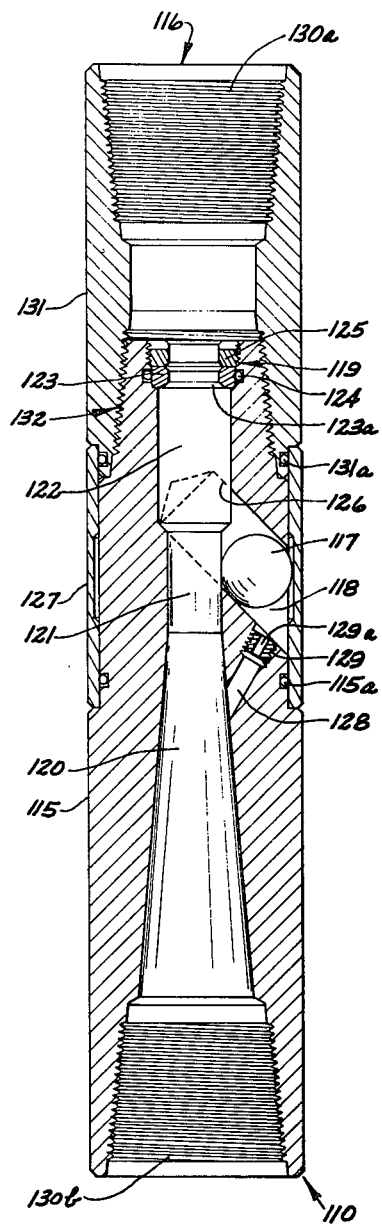
FIG. 4 is an enlarged cross-sectional vertical elevation illustrating an alternate embodiment of the check valve assembly of the present invention in an open position.

In FIG. 1, a well, designated at A, employs a drill string check valve assembly indicated generally at 10. A casing 11 is set in the well A in the usual manner. A drill bit 12 is lowered into the well A through the casing 11 on a string of drill pipe 13. The check valve assembly 10 may be threadedly fastened to the end of the drill string 13 and also to the drill bit 12 by an adaptor fitting 14.

The assembly 10 comprises a body 15 and a central bore 16, through which fluid is allowed to flow unrestricted in a downwardly direction. If flow is reversed and increased to a predetermined rate, a valve ball 17 is displaced from a recess 18 in the body 15 into the bore 16 and lifted vertically by the fluid flow into engagement with a valve seat assembly 19 which completely stops the reverse flow. Although FIG. 1 illustrates the assembly 10 as being connected adjacent to the drill bit 12, it is not necessary that it be located in that position. It is possible for the assembly 10 to be placed at any joint along the drill string 13.

Referring now to FIG. 2 greater detail of the assembly 10 is shown. As illustrated, the assembly 10 comprises the cylindrical body 15 and a longitudinal central bore 16, divided into three distinct sections; a converging lower frusto-conical bore 20, a restricted cylindrical bore or throat 21, and an expanded upper cylindrical bore 22.

Female threads 30a and 30b located at each end of body 15 are used to connect the assembly 10 to a drill string. Located at the upper end of the bore 22 is the valve seat assembly 19, having a valve seat bushing 23 with a valve seat surface 23a. A resilient O-ring seal 24 encircles the bushing 23 and forms a fluid-tight seal between the bushing 23 and the body 15. To allow for replacement of the bushing 23 and to maintain the correct positioning, an externally threaded lock nut 25 is positioned above the bushing 23.

The ball recess 18 is inclined and projects into the central restricting bore 21 to form a ball guide 26. A cover plate 27 may be welded to the body 15 to cover the recess 18 and to allow access to the ball 17.

A pressure equalizing passage 28 is located in the body 15 between the recess 18 and the frustoconical bore 20. Located in the passage 28 is an externally threaded orifice bushing 29 with a cylindrical bore or orifice 29a. The positioning of the passage 28 may be such as to allow removal of the orifice bushing 29 from the lower frusto-conical bore 20. It is the size of the orifice 29a in the bushing 29 which determines the reverse flow rate permitted.

During drilling operations, fluid is pumped down the drill string 13 through the bore 16 and out the drill bit 12. The fluid assists the mechanical cutting action of the drill bit 12 and returns cuttings to the surface of the well. Also, when the drill string 13 has to be removed from the well bore, the hydrostatic pressure of the fluid will seal the well bore.

When drilling resumes, after removal of a drill bit, the drill string 13 must again be lowered into the well bore. The drill string 13 can be lowered by gravity, until the weight of the fluid displaced by the drill string equals the weight of the drill string 13. It is then necessary to either pump fluid into the top of the drill string 13 to increase the weight, or to have a valve assembly, such as the one described herein, to allow the drill string 13 to fill from the bottom. Therefore, it is desirable to have a check valve assembly with reverse flow capabilities like the assembly 10. But, the reverse flow rate must be regulated so that when the drill bit 12 enters a high pressure area, the valve will completely close and prevent reverse flow of fluid.

If the pressure below the drill bit 12 is greater than the pressure in the drill string 13, the fluid will start to flow upwardly through the drill string 13. When the reverse flow reaches a predetermined rate, the ball 17 will be displaced from the recess 18 into the bore 22 and the fluid will force the ball 17 into contact with the seat surface 23a. The ball 17 is displaced because of a pressure differential created between the recess 18 and the restricted central bore or throat 21. This pressure differential exists because the entire hydraulic head within the recess 18 is in the form of pressure energy, whereas the same hydraulic head in the throat 21 is partially in the form of kinetic energy embodied in the fluid flow. The pressure at the throat is therefore lower than that in the recess 18. This is in accordance with the well established principle outlined in hydraulic textbooks, e.g., "Fluid Dynamics" by Daily and Harleman (Addison-Wesley 1966), and which is expressed quantitatively by the well known equation of Bernoulli.

When the orifice bushing 29 is blanked off so as to allow no communication of pressure through it, the initial pressure differential acting on the ball 17 will be at a maximum. However, if an orifice 29a is fitted in the bushing, some reduction of pressure will take place in the recess due to this communication. The larger the bore 29a the higher the flow rate which will cause the ball 17 to be displaced from recess 18 into bore 22 and to be forced upwardly into engagement with valve seat surface 23a, as illustrated in FIG. 3.

Subsequently, when the pressure below the valve assembly 19 becomes less than the pressure above, the ball 17 will drop down the bore 22 to guide 26 and will be diverted back into the recess 18 because of the gravity acting on the ball 17 and the reduced diameter of the throat 21, which is insufficient to pass the ball. The passage 28, or the clearance between ball 17 and recess 18, will allow the fluid displaced by the ball 17 to escape from the recess 18. When the ball 17 has returned to the recess 18, the drilling process can be resumed.

FIG. 4 refers to another form of the drill string check valve assembly indicated generally at 110. The construction and operation of the assembly 110 is basically the same as that of the assembly 10 in FIGS. 1-3. Therefore, to avoid repetition of description, the reference numbers for similar components in the assembly 110 have "100" added to the reference number of corresponding components in the assembly 10. The basic difference of the assembly 110 is that it comprises three sections; a body 115, a sleeve 127 and a collar 131; instead of the single body 15 of FIGS. 1-3. The sleeve 127 is removable to facilitate access to the ball recess 118 and also the passage 128 so that the ball 117 and orifice bushing 129 can readily be replaced. The collar 131 is threadedly fastened to the upper portion of the housing 115 and maintains correct positioning of the sleeve 127. Encircling the body 115 and the collar 131 are two resilient O-rings, 115a and 131a, respectively, forming a fluid-tight seal around the sleeve 127.

It will be appreciated that the replacement of the valve seat assembly 119, ball 117, and orifice bushing 129 can be accomplished by unthreading the collar 131 from the body 115 and lifting the sleeve 127 from the housing 115. In this form, only the upper joint 132 has to be taken apart to replace all components in the assembly 110.

Figure 5:
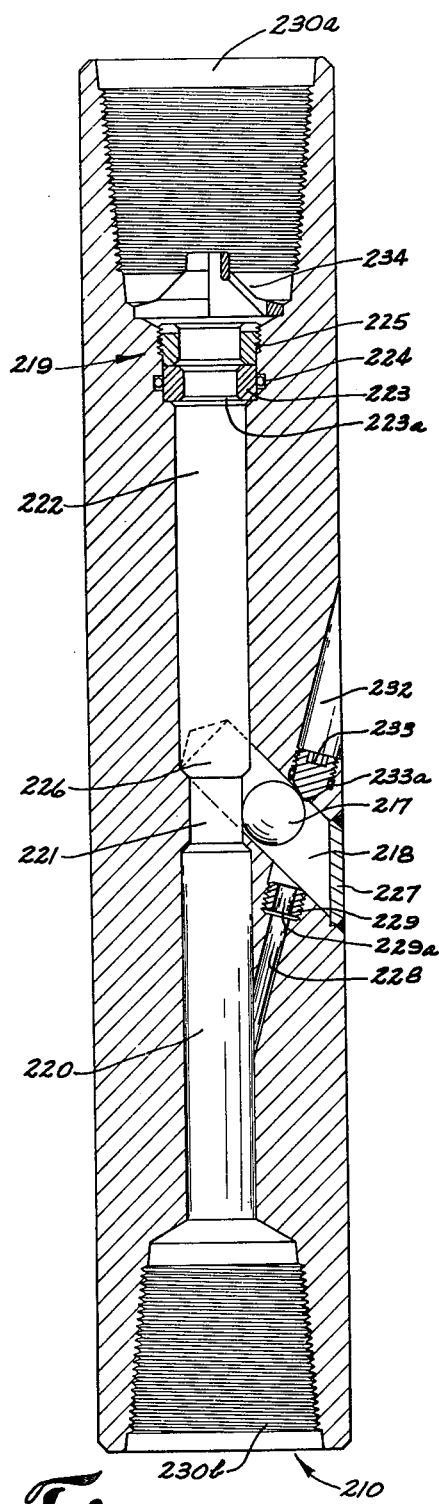
FIG. 5 is an enlarged cross-sectional vertical elevation illustrating another alternate embodiment of the check valve assembly of the present invention in the open position.

Another modification of the invention, indicated generally at 210, is shown in FIG. 5. The assembly is referenced to the specifications of FIGS. 1-3 by adding "200" to the reference numbers of corresponding components of assembly 10. The assembly 210 is designed to respond more rapidly to a pressure increase.

A bore 232 is aligned with the pressure equalizing passage 228 and allows replacement of the orifice bushing 229. A blunt-nosed set screw 233 may be used to plug the bore 232 and also to position the ball 217 away from the cover plate 227. The ball 217 is placed nearer the bore 221 than in the previously described embodiments. Therefore, the pressure differential needed to displace the ball 217 into the flowstream is lower and will result in faster action. Encircling the set screw 233 is a resilient O-ring 233a forming a fluid-tight seal between the bore 232 and the set screw 233. Although such is not necessary, a conventional adaptor 234 designed to cooperate with a well logging device is shown located above the valve seat assembly 219.

Figure 6:
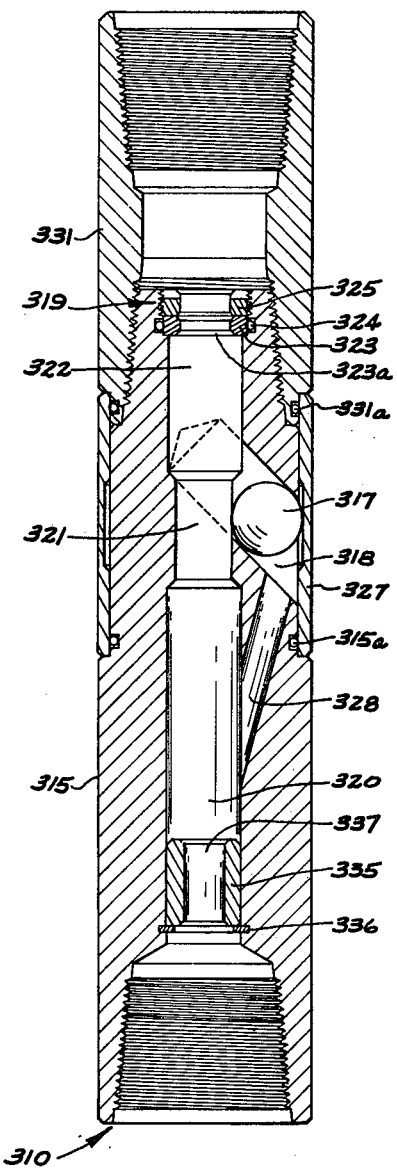
FIG. 6 is an enlarged cross-sectional vertical elevation illustrating another alternate embodiment of the check valve assembly of the present invention in the open position.

Referring now to FIG. 6, still another modification of the drill string check valve assembly, indicated at 310, will be described. It consists of a lower body 315, an upper collar 331, and a removable sleeve 327. The lower bore section 320 is cylindrical, instead of frusto-conical as in previous modifications, FIGS. 1-15.

To assist in achieving the pressure differential, a slidable restricting sleeve 335 may be located in the bore 320. To prevent the sleeve 335 from exiting the lower bore 320, a snap ring 336 may be placed in a groove at the lower end of bore 320. In normal operation, the sleeve 335 is forced into contact with the snap ring 336. When a reverse flow occurs, the sleeve 335 will slide upwardly, being forced by the fluid into position adjacent the central restricting bore 321. The additional restriction caused by the sleeve 335 will make the pressure differential between the restricted bore or throat 321 and the lower bore section 320 great enough to displace the ball 317 from the recess 318. Control of reverse flow differential is determined by the size of the bore 337 in the sleeve 335. Therefore, in this modification, it is not necessary to have an orifice or orifice bushing in the passage 328.

Figure 7:
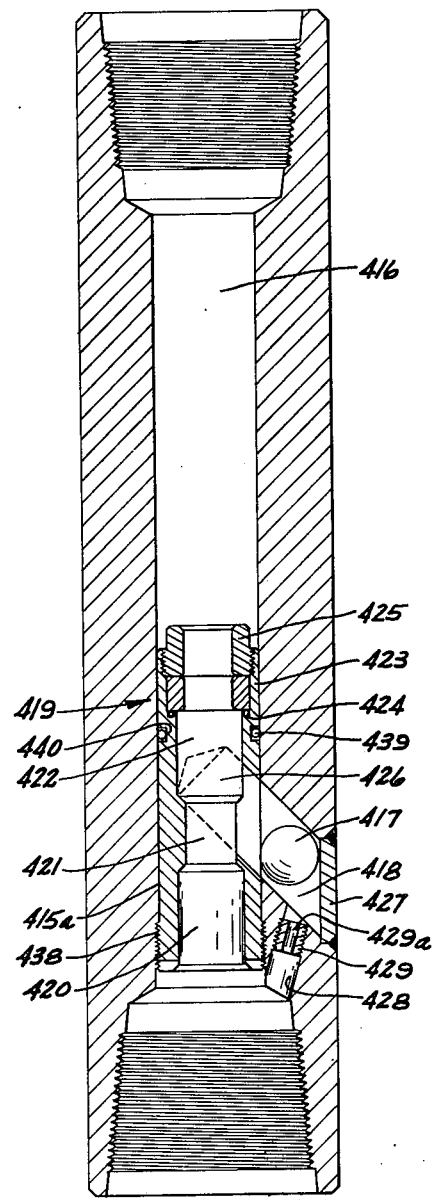
FIG. 7 is an enlarged cross-sectional vertical elevation illustrating still another alternate embodiment of the check valve assembly of the present invention.

With reference to FIG. 7, still another modification of the drill string check valve assembly, generally indicated at 410, will be described. In this form, the body 415 contains a removable tubular insert 415a inserted in the bore 416. It will be appreciated that the insert 415a is threadedly secured at 438, allowing its removal when replacement of the valve seat bushing 423 is necessary because of the wear on the seating surface 423a. The insert 415a contains bore sections 420, 421 and 422 which create the Venturi effect necessary for displacing ball 417 from recess 418. The valve assembly 419 includes a bushing 423, O-ring 424, lock-nut 425, and ball return guide 426. A fluid-tight seal between the body 415 and removable section 415a is formed by a resilient O-ring 439 located in a groove 440 surrounding section 415a.

Figure 8:
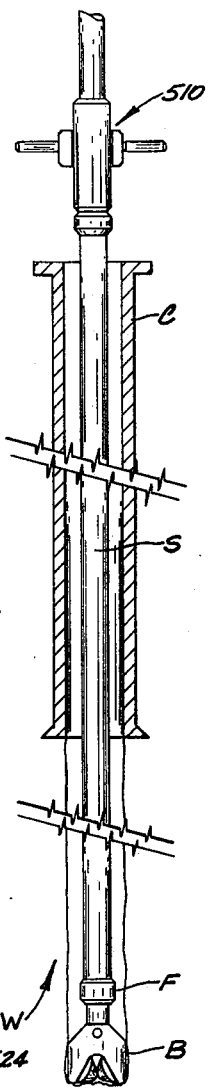
FIG. 8 is a vertical elevation, partially in section, schematically illustrating an embodiment of the check valve assembly of the present invention employed in a drill string.

Referring to FIG. 8, still another embodiment of the invention is shown for use in a well, generally indicated at W, having a casing C set in the well W in the usual manner. A drill bit B is shown attached to drill string S by an adaptor fitting F and lowered into the well W through the casing C. The check valve assembly of the present embodiment is indicated generally at 510 near the surface in the drill string S.

Figure 9:
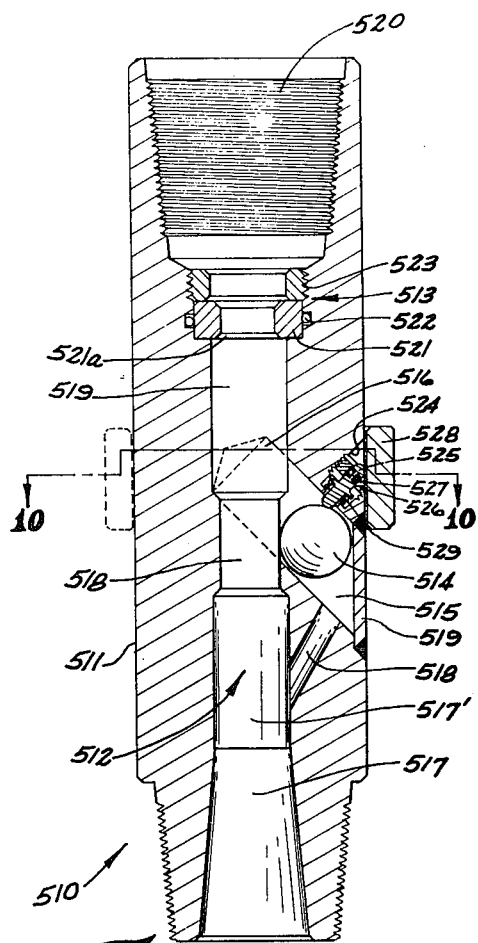
FIG. 9 is an enlarged vertical cross-section illustrating, in more detail, the alternate embodiment of the check valve assembly shown in the drill string of FIG. 8.

As may best be seen by reference to FIG. 9, the assembly 510 includes a body 511, having a multi-section longitudinal bore 512, a valve seat assembly 513, and a ball valve 514 positioned out of the bore 512 in an inclined recess 515 in the body 511. A ball return guide 516 projects from the recess 515 into the bore 512.

The bore 512 is designed to function as a Venturi, having a lower frusto-conical section 517, a lower cylindrical section 517', a central restricting section 518, and an enlarged upper cylindrical section 519 which allows axial movement of the ball 514. Communicating between the frusto-conical bore 517, lower cylindrical bore 517' and the recess 515 is a pressure equalizing passage 518. A cover plate 519 may be welded to the body to cover the hole made during the construction of the recess 515 and the passage 518.

Located below a threaded box 520 in the upper portion of the body 511 is the valve seat assembly 513 which includes a valve seat bushing 521 having an annular seating surface 521a. A resilient O-ring 522 encircles the bushing 521 to form a fluid-tight seal between the bushing 521 and the body 511. An externally threaded lock-nut 523 maintains the correct positioning of the valve seat bushing 521 and allows replacement of the bushing 521 when the seating surface 521a becomes eroded.

Figure 10:
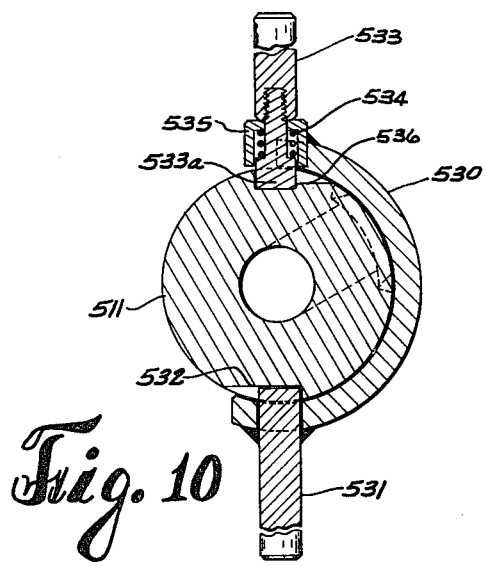
FIG. 10 is a horizontal cross-section, taken along line 10—10 of FIG. 9, illustrating the construction of the collar assembly of the assembly of FIG. 9.
Figure 12:
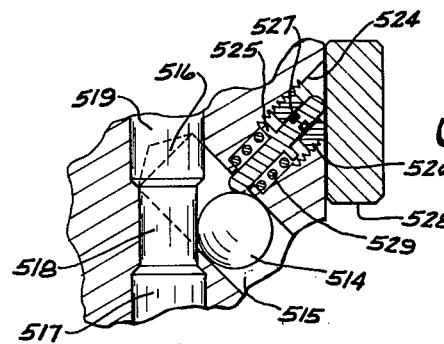
FIG. 12 is a enlarged partial section further illustrating a retainer pin for the check valve assembly of FIG. 8-11.

A tapped bore 524 communicates with recess 515 from the outside of housing 511. A lock pin 525 is disposed in the bore 524 and held in a movable position by an externally threaded bushing 526. A resilient O-ring 527 encircles the pin 525 and forms a fluid-tight seal between the pin 525 and the bushing 526. To keep the ball 514 in the recess 515, a clamp assembly 528 may be provided for engagement with the housing 511 and the end of pin 525 to compress a biasing spring 529 forcing the pin 525 to protrude into the recess 515, as best illustrated in FIG. 12. FIGS. 9 and 10 illustrate the clamp assembly 528 after being installed in the drill string S of FIG. 8.

Figure 11:
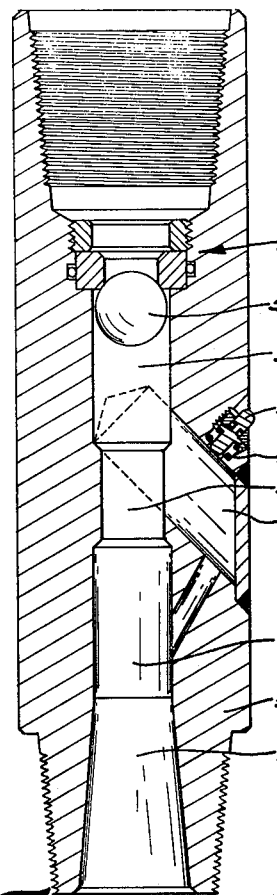
FIG. 11 is a view similar to FIG. 9 illustrating the check valve assembly in the closed position.

The clamp assembly 528 may be removed from the body 511, releasing the tension on spring 529 and allowing pin 525 to be retracted. Reverse fluid flow will create a high pressure area in the bore 517' and recess 515 and a lower pressure area in the bore 518. The pressure differential will displace the ball 514 from recess 515, since the pin 525 no longer protrudes into the recess 515, and the ball 514 will move axially upward into sealing engagement with the valve seating surface 521a, as shown in FIG. 11. With the ball 514 seated in the seat 521a, the reverse flow will be completely stopped. To return the ball 514 to its normal position in recess 515, the pressure above the valve assembly 513 must be greater than the pressure in the bore 517. The pressure differential, as well as gravity, will then force the ball 514 down the bore 519, guide 516 and into the recess 515.

Details of the construction of the removable clamp assembly 528 is illustrated in FIG. 10. The clamp assembly 528 includes a C-shaped bracket 530 and a stationary cylindrical handle 531 welded to the bracket 530. The handle 531 engages a notch 532 located in the body 511 of the assembly 510. The second handle 533 is internally threaded for connection with a threaded pin 533a. A spring 534 encircles the pin 533a within a retainer socket 535 which has an opening to allow the threaded portion of the pin 533a to extend therethrough. The socket 535 is welded to the bracket 530 and the handle 533 threaded onto the pin 533a. The clamp assembly 528 is held in place by the biasing spring 534 which forces the head of the pin 533a to engage notch 536 in the body 511.

When the check valve assembly 510 is installed in the drill string S, it can be made operative in response to reverse flow of fluid by removing clamp assembly 528. This can be accomplished by pulling the handle 533 outwardly from the housing 511, compressing the spring 534 and disengaging the pin 533a from notch 536. With the collar assembly 528 removed, contact with the lock pin 525 is lost, and the biasing spring 529 retracts the pin 525 from the recess 515, allowing the ball 514 to move into the flow path and seat in the valve seat assembly 513.

The foregoing description has disclosed a unique check valve assembly for control of reverse flow in drill strings. Such an assembly is reliable and simple to manufacture. Although, several embodiments of the assembly have been described herein, the invention is not so limited. Various changes in the size, shape, and materials of the assembly, as well as in the details of construction, may be made without departing from the spirit of the invention. For example, although it is preferable from the standpoint of control, it is not necessary that the check valve assembly of the present invention be provided with an equalizing passage such as 28 in FIG. 1. However, if there is no equalizing passage, enough clearance must be provided between the ball closure member and its recess to allow displacement of fluid from the recess or return of the ball from the closed position. It is therefore intended that the scope of the invention be limited only by the claims which follow.

It is claimed that:

1. A drill string assembly comprising a drill bit connected to the lower end of a string of drill pipe and check valve means connected in said drill pipe above said drill bit, said check valve means comprising:
   a. a valve body having a longitudinal flowbore therethrough, said flowbore having a lower section, an intermediate section of restricted diameter and a cylindrical upper section of a diameter greater than said intermediate section;
   b. seat means carried by said valve body adjacent said upper flowbore section;
   c. recess means in said valve body communicating with said flowbore near the upper end of said intermediate section;
   d. ball closure means normally carried in said recess means out of said flowbore but movable from said recess means into said upper flowbore section in response to upward flow of fluids through said check valve means above a predetermined rate to sealingly engage said seat means, blocking upward flow of fluids through said drill string assembly; and
   e. plug means projecting into said recess means engageable and operable externally of said valve body for engagement with said ball closure means to selectively prevent exit of said ball closure means from said recess means.

2. A drill string assembly as set forth in claim 1 in which said valve recess means communicates with said lower flowbore section through a pressure equalizing passage in said valve body.

3. A drill string assembly as set forth in claim 1 in which said seat means is removably mounted in said valve body allowing replacement thereof through said flowbore.

4. A drill string assembly as set forth in claim 1 in which said plug means comprises pin means movable from a first position engaging said ball closure member to a retracted position permitting said ball closure member to exit said recess means.

5. A drill string assembly as set forth in claim 1 in which the outside diameter of said check valve means is no greater than the largest outside diameter of said string of drill pipe.

6. A drill string assembly comprising a drill bit connected to the lower end of a string of drill pipe and check valve means connected in said drill pipe above said drill bit, said check valve means comprising:
   a. a valve body having a longitudinal flowbore therethrough, said flowbore having a lower section, an intermediate section of restricted diameter and a cylindrical upper section of a diameter greater than said intermediate section;
   b. seat means carried by said valve body adjacent said upper flowbore section;
   c. recess means in said valve body communicating with said flowbore near the upper end of said intermediate section;
   d. ball closure means normally carried in said recess means out of said flowbore but movable from said recess means into said upper flowbore section in response to upward flow of fluids through said check valve means above a predetermined rate to sealingly engage said seat means, blocking upward flow of fluids through said drill string assembly;
   e. pin means projecting into said recess means and movable from a first position engaging said ball closure means to a retracted position for selectively and respectively preventing and permitting exit of said ball closure member from said recess means; and
   f. biasing means biasing said pin means toward said retracted position.

7. A drill string assembly as set forth in claim 6 comprising clamp means positionable around said valve body to hold said pin means in said first position.

* * * * *